United States Patent
Nakamura et al.

(10) Patent No.: US 7,196,486 B2
(45) Date of Patent: Mar. 27, 2007

(54) APPARATUS FOR DETECTING OBSTACLE TO POWER REGULATED WINDOW

(75) Inventors: Yasushi Nakamura, Shizuoka (JP); Yasuyuki Mochizuki, Shizuoka (JP); Yuichi Nakazawa, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/334,724

(22) Filed: Jan. 2, 2003

(65) Prior Publication Data
US 2003/0137266 A1 Jul. 24, 2003

(30) Foreign Application Priority Data
Jan. 22, 2002 (JP) ............... 2002-012922

(51) Int. Cl.
*H02P 1/04* (2006.01)
(52) U.S. Cl. ............ 318/469; 318/461; 318/476; 318/484
(58) Field of Classification Search ........ 318/461–470, 318/443–445
See application file for complete search history.

(56) References Cited

U.S. PATENT DOCUMENTS

| | | | | |
|---|---|---|---|---|
| 3,878,915 A | * | 4/1975 | Purland et al. ............ | 180/170 |
| 4,641,067 A | | 2/1987 | Iizawa et al. ............... | 318/287 |
| 4,870,333 A | * | 9/1989 | Itoh et al. ................... | 318/286 |
| 5,334,876 A | * | 8/1994 | Washeleski et al. ....... | 307/10.1 |
| 5,410,226 A | * | 4/1995 | Sekiguchi et al. .......... | 318/266 |
| 5,530,329 A | * | 6/1996 | Shigematsu et al. ....... | 318/469 |
| 5,952,801 A | * | 9/1999 | Boisvert et al. ............ | 318/468 |
| 6,064,165 A | * | 5/2000 | Boisvert et al. ............ | 318/465 |
| 6,086,177 A | * | 7/2000 | Driendl et al. .............. | 318/466 |
| 6,164,015 A | * | 12/2000 | Kawanobe et al. .......... | 49/360 |
| 6,329,779 B1 | * | 12/2001 | Pimley et al. .............. | 318/445 |
| 6,404,158 B1 | * | 6/2002 | Boisvert et al. ............ | 318/469 |
| 6,573,677 B2 | * | 6/2003 | Gerbetz ...................... | 318/445 |
| 6,667,590 B2 | * | 12/2003 | Nagaoka .................... | 318/286 |

FOREIGN PATENT DOCUMENTS

| | | |
|---|---|---|
| DE | 33 03 590 A1 | 8/1984 |
| DE | 34 33 204 A1 | 3/1985 |
| DE | 3532078 C2 | 5/1988 |
| JP | 9-112127 | 4/1997 |

* cited by examiner

*Primary Examiner*—Lincoln Donovan
*Assistant Examiner*—Renata McCloud
(74) *Attorney, Agent, or Firm*—Armstrong, Kratz, Quintos, Hanson, & Brooks, LLP.

(57) ABSTRACT

An apparatus for detecting an obstacle to a power regulated window, which can detect existence of an obstacle by a method of differential current at low rotating speed of a motor and reduce a force of biting an obstacle and prevent from detecting an obstacle unexpectedly at high rotating speed, includes current detecting means for detecting a value of load current flowing through the motor, reference-value generating means for generating a reference value correspondingly to rotating speed of the motor for judging when the value of load current exceeds a predetermined value of over-load current, and comparing means for judging whether or not the value of load current exceeds the reference value.

2 Claims, 5 Drawing Sheets

APPARATUS FOR DETECTING OBSTACLE TO POWER REGULATED WINDOW

BACKGROUND OF THE INVENTION

1. Field of the Invention

This invention relates to an apparatus for detecting an obstacle to a power regulated window for detecting existence of an obstacle in a window glass driven by a power regulator in a vehicle.

2. Description of the Related Art

Generally in a vehicle especially a passenger car, a power regulated window for opening/closing a window glass such as a door window automatically by motor drive controlled by switch operation is applied. These days, an apparatus for detecting an obstacle for detecting whether or not an obstacle such as an article or a part of a human body is bitten between a window glass and a door frame is additionally provided on the power regulated window.

FIG. 6 shows an apparatus for detecting an obstacle to a power regulated window as one general example. A method of current differential to judge existence of an obstacle when a current differential value exceeds a predetermined constant value by detecting change (differential value) of current flowing through a motor for driving a power regulated window is applied to the apparatus.

The apparatus includes a current sensor Si connected in series with an armature of a motor M between a plus power source +V and a ground for detecting current flowing through the armature and outputting a value converted from the current to voltage, an amplifier AMP for outputting a momentary value of voltage Vins (call momentary value hereafter) by amplifying the converted-to-voltage armature current into predetermined voltage range, an averaging circuit AV for outputting an average value Vav by averaging the momentary value Vins with a fixed time constant, a threshold setting portion (not shown) for reducing the amplified momentary value Vins entirely under the average value Vav to set a threshold value for judgment between the momentary value Vins and the average value Vav, and a comparator CMP for comparing the momentary value Vins after being reduced to the voltage range with the average value Vav. The averaging circuit AV is provided with a capacitor C for setting the time constant.

Operation of the apparatus will be described.

In the current sensor Si, the current flowing through the armature of the motor M for driving the power regulated window flows a not-shown resistor to detect the current value converted to a voltage value and the voltage value as a momentary value Vins is transmitted to the amplifier AMP to be amplified to the predetermined voltage range.

The amplified momentary value Vins is transmitted to the averaging circuit AV having a fixed time constant to be averaged as the average value Vav inputted into the comparator CMP. After the amplified momentary value Vins is reduced entirely constantly under the average value Vav in the threshold setting portion in which the threshold value is set in a minus voltage, the momentary value Vins is inputted into the comparator CMP.

The momentary value Vins follows under the threshold value for judgment Vsh from the average value Vav to have slower change of current (di/dt1) of the momentary value than change of current by the time constant of the averaging circuit AV, unless the motor is overloaded, as shown in FIG. 7. Therefore, the momentary value Vins is maintained constantly under the threshold value for judgment Vsh from the average value Vav so that the comparator CMP never output a signal of judgment of existence of an obstacle OUT1.

When an obstacle such as a finger is clamped by the window glass during closing the window and overcurrent flows through the motor M, the momentary value Vins has faster change (di/dt2) than change by the time constant of the averaging circuit AV so that the momentary value Vins over the slowly changing average value Vav is inputted into the comparator CMP. Thereby, the comparator CMP outputs a signal of judgment of existence of an obstacle OUT1.

3. Objects to be Solved

The apparatus, as mentioned above, judges existence of an obstacle when the ratio of change di/dt of the momentary value exceeds the fixed value. However, if an obstacle to a window exists when the drive voltage is reduced by low temperature around the motor and steady rotating speed is very slow, the obstacle could not be detected by change of the momentary value Vins.

The average value Vav as a reference value for judgement of existence of an obstacle is generated to smooth the momentary value with a predetermined time constant so that the average value follows to the momentary value correspondingly to slower change of current (the momentary value) than the time constant.

To solve the above drawback, it can be considered for detecting an obstacle in low rotating speed to enlarge the time constant of the averaging circuit for generating more slower change of the average value than the slow change of the momentary value. In this apparatus, if, at high drive voltage and high rotating speed of the motor, the momentary value changes excessively by overloading on the motor caused by the other than existence of an obstacle such as resistance force against sliding window enlarged by temperature change of outside, the momentary value may exceed the average value easily and existence of an obstacle may be detected unexpectedly. Therefore, the time constant can not be enlarged over a certain value.

To solve the above drawback, a method of detecting an obstacle by providing a circuit for calculating a deferential value with the absolute value of a difference between respective values of momentary current at each time interval in low rotating speed, and detecting an obstacle with the absolute value of a difference between respective values of momentary current when an obstacle can not be detected with the deferential value of the momentary current may be applied. However, the reference absolute value can not be set low enough in this method so that, when an obstacle exists, an obstacle can not be detected until the momentary current over a predetermined reference absolute value flows, and then a force of biting an obstacle is increased.

To overcome the above drawback, one object of this invention is to provide an apparatus for detecting an obstacle to a power regulated window, which can detect the obstacle by a method of differential current at low rotating speed of a motor and reduce a force of biting the obstacle and also prevent from detecting existence of an obstacle unexpectedly at high rotating speed of a motor.

SUMMARY OF THE INVENTION

How to Attain the Object

In order to attain the objects, an apparatus for detecting an obstacle to a power regulated window according to this invention is an apparatus for detecting an obstacle to a power regulated window which opens and closes a window glass by a motor, including current detecting means for detecting a value of load current flowing through the motor, reference-value generating means for generating a reference value correspondingly to rotating speed of the motor for judging when the value of load current flowing through the motor exceeds a predetermined value of over-load current, and comparing means for judging whether or not the value of load current of the motor exceeds the reference value by comparing the detected value of load current of the motor with the generated reference value, to detect existence of a bitten obstacle by a result of the comparing means.

According to the structure mentioned above, comparing the value of the load current of the motor, detected by the current detecting means on moving the window glass toward a direction for totally closing by the motor, with the reference value for judging when the value of the load current exceeds the predetermined value of over-load current generated correspondingly to rotating speed of the motor, an obstacle to a power regulated window is detected when the detected value of load current exceeds the reference value.

An apparatus for detecting an obstacle to a power regulated window according to this invention is an apparatus for detecting an obstacle to a power regulated window which opens and closes a window glass by a motor, including current detecting means for detecting a momentary value of load current flowing through the motor, pulse-signal outputting means for outputting a pulse signal having a longer pulse interval correspondingly to retardation of rotating speed of the motor, average-value generating means for generating and outputting an average value having rate-of-change of an amplitude being variable in response to a time constant while has been set to have a time length in coincidence with a period of the pulse signal as a reference value for judging when the value of load current of the motor exceeds a predetermined value of over-load current, and comparing means for judging whether or not the momentary value detected by the current detecting means exceeds the average value outputted by average-value generating means by comparing the momentary value with the average value, to detect existence of a bitten obstacle by a result of the comparing means.

According to the structure mentioned above, by means of setting the time constant correspondingly to the rotating speed of the motor, the time constant determining the rate-of-change of the average value as a reference value of the load current at overload, even if an obstacle exists at low rotating speed of the motor, the detected momentary value of the load current of the motor changes slowly toward the average value corresponding to the rotating speed and a signal of judgment of existence of an obstacle is outputted when the momentary value exceeds the average value.

In the apparatus for detecting an obstacle to a power regulated window according to this invention, the average-value generating means elongates the time constant equivalently to a shortened ON time per a unit time when OFF time of the pulse signal is elongated by retarding the rotating speed of the motor.

According to the structure mentioned above, when the rotating speed of the motor is retarded, the period of respective outputted pulses elongates correspondingly to retardation of rotating speed of the motor and ON time per unit time of the pulse signal is shorten to elongate the time constant equivalently so that, generating the average value into the comparing means with the time constant, the average value can be generated without influence of change of the load current at low rotating speed of the motor.

The above and other objects and features of this invention will become more apparent from the following description taken in conjunction with the accompanying drawings.

DESCRIPTION OF THE PREFERRED EMBODIMENT

An apparatus for detecting an obstacle to a power regulated window according to an embodiment of this invention will be described with reference to drawings. Instead of a fixed time constant in an averaging circuit of a general apparatus, the time constant is changed correspondingly to rotating speed of a motor in this embodiment so that an obstacle can be detected easier with a detecting method by differential current even if the rotating speed of the motor is retarded. Physically, the averaging circuit is structured by a circuit which performs to elongate the time constant at low rotating speed and shorten the time constant at high rotating speed.

Figure 1A:
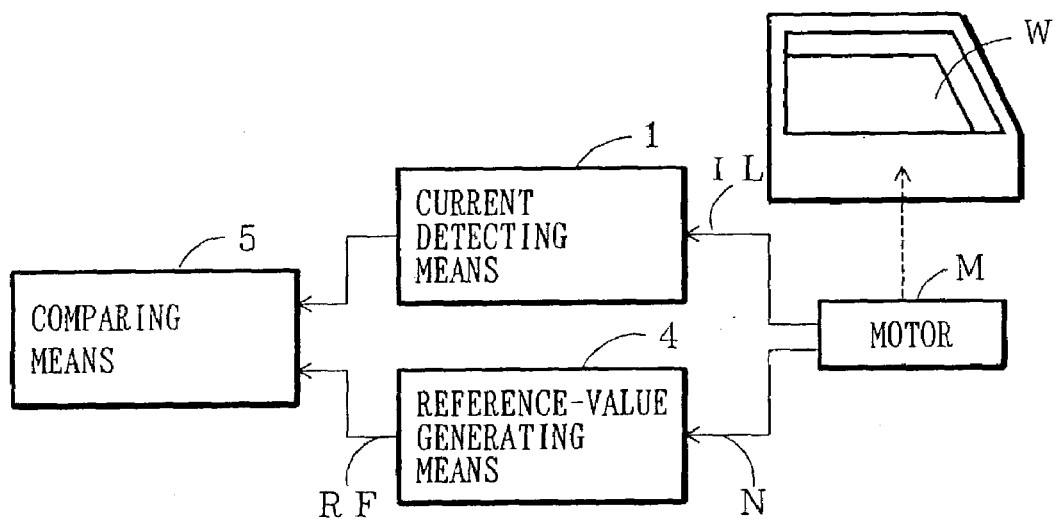
FIG. 1A is a basic block diagram of an apparatus for detecting an obstacle to a power regulated window according to the first embodiment of this invention.

In order to attain the objects, an apparatus for detecting an obstacle to a power regulated window according to this invention, as shown in a basic block diagram of FIG. 1A, is an apparatus for detecting an obstacle to a power regulated window which opens and closes a window glass W by a motor M, including current detecting means 1 for detecting a value of load current IL flowing through the motor M, reference-value generating means 4 for generating a reference value RF correspondingly to rotating speed N of the motor M for judging when the value of load current IL flowing through the motor M exceeds a predetermined value of over-load current, and comparing means 5 for judging whether or not the value of load current IL of the motor M exceeds the reference value RF by comparing the detected value of load current IL of the motor M with the generated reference value RF, to detect existence of a bitten obstacle by a result of the comparing means.

According to the structure mentioned above, comparing the value of the load current IL of the motor M, detected by the current detecting means 1 on moving the window glass W toward a direction for totally closing by the motor M, with the reference value RF for judging when the value of the load current IL exceeds the predetermined value of over-load current generated correspondingly to rotating speed N of the motor M, an obstacle to a power regulated window is detected when the detected value of load current IL exceeds the reference value RF.

Figure 1B:
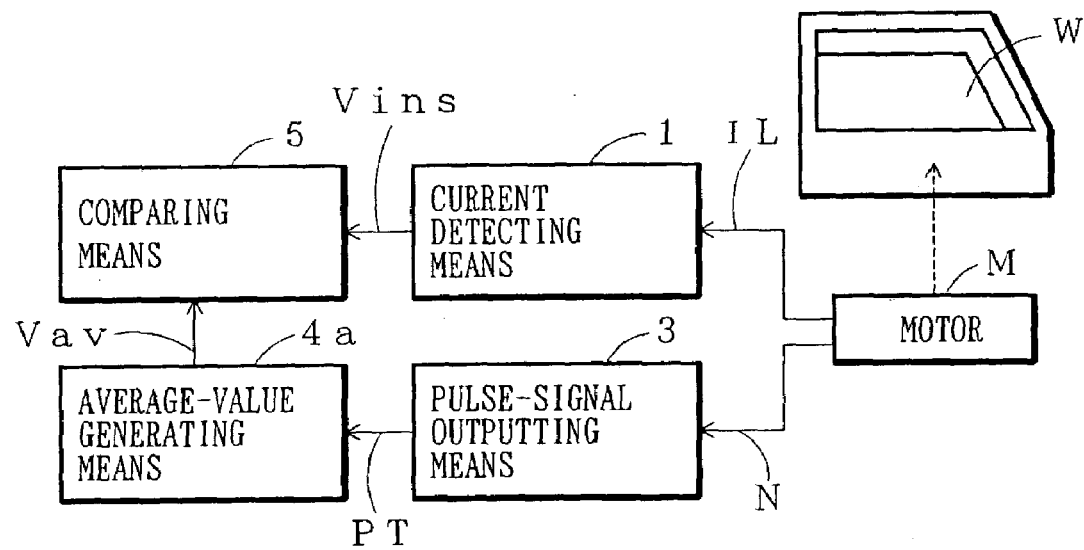
FIG. 1B is a basic block diagram of an apparatus for detecting an obstacle to a power regulated window according to the second embodiment of this invention.

An apparatus for detecting an obstacle to a power regulated window according to this invention, as shown in a basic block diagram of FIG. 1B, is an apparatus for detecting an obstacle to a power regulated window which opens and closes a window glass W by a motor M, including current detecting means 1 for detecting a momentary value Vins of load current flowing through the motor M, pulse-signal outputting means 3 for outputting a pulse signal PT having a longer pulse interval correspondingly to retardation of rotating speed N of the motor M, average-value generating means 4a for generating and outputting an average value Vav having rate-of-change of an amplitude being variable in response to a time constant while has been set to have a time length in coincidence with a period of the pulse signal as a reference value for judging when the value of load current IL of the motor M exceeds a predetermined value of over-load current, and comparing means 5 for judging whether or not the momentary value Vins detected by the current detecting means 1 exceeds the average value Vav outputted by average-value generating means 4a by comparing the momentary value Vins with the average value Vav, to detect existence of a bitten obstacle by a result of the comparing means.

According to the structure mentioned above, by means of setting the time constant correspondingly to the rotating speed N of the motor M, the time constant determining the rate-of-change of the average value Vav as a reference value of the load current IL at overload, even if an obstacle exists at low rotating speed of the motor, the detected momentary value Vins of the load current of the motor changes slowly toward the average value Vav corresponding to the rotating speed and a signal of judgment of existence of an obstacle is outputted when the momentary value Vins exceeds the average value.

In the apparatus for detecting an obstacle to a power regulated window according to this invention, the average-value generating means 4a elongates the time constant equivalently to a shortened ON time per a unit time when OFF time of the pulse signal is elongated by retarding the rotating speed of the motor.

According to the structure mentioned above, when the rotating speed of the motor M is retarded, the period of respective outputted pulses elongates correspondingly to retardation of rotating speed of the motor and ON time per unit time of the pulse signal is shorten to elongate the time constant equivalently so that, generating the average value into the comparing means with the time constant, the average value can be generated without influence of change of the load current at low rotating speed of the motor.

Figure 2:
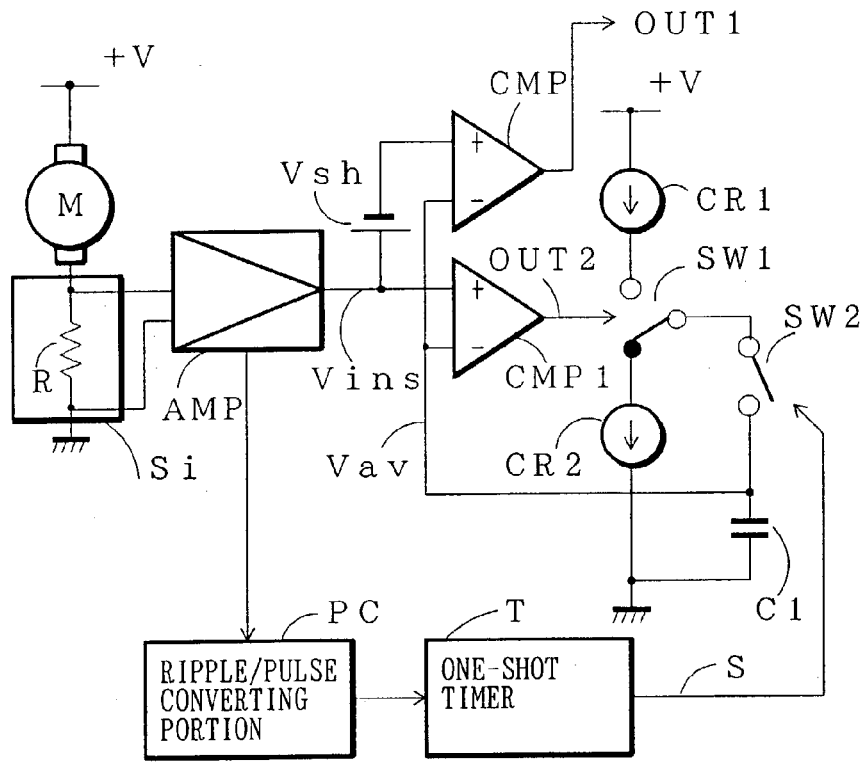
FIG. 2 is a circuit diagram of the apparatus for detecting an obstacle to a power regulated window according to the second embodiment.
Figure 6:
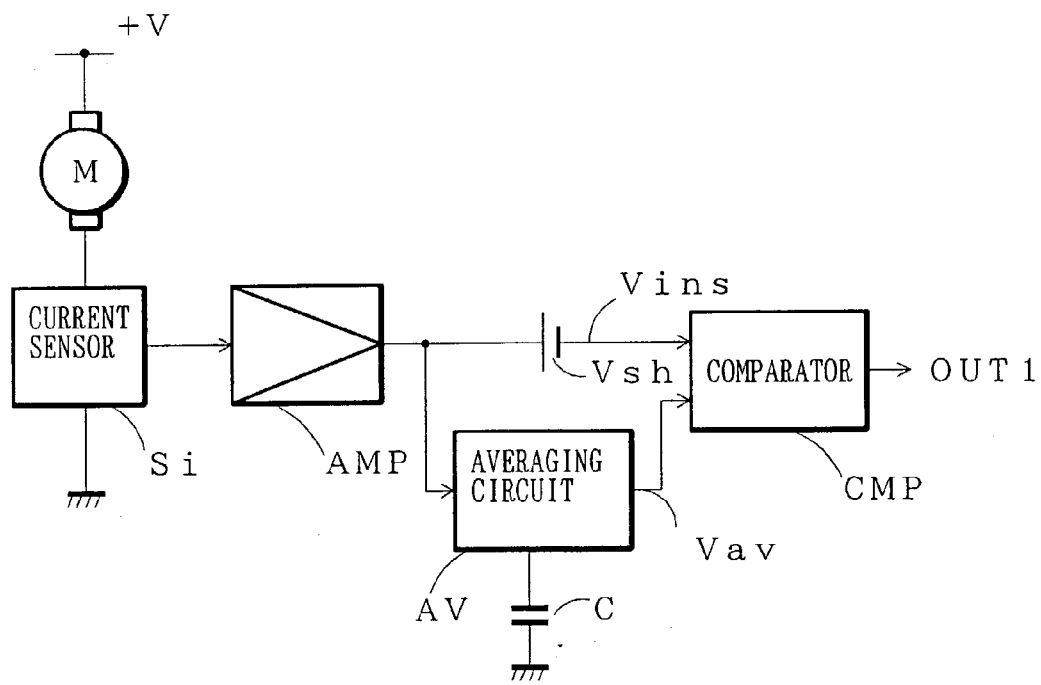
FIG. 6 is a basic block diagram of a general apparatus for detecting an obstacle to a power regulated window.

FIG. 2 is a circuit diagram of the apparatus for detecting an obstacle to a power regulated window according to this embodiment. In FIG. 2, the same markings as markings in FIG. 6 indicate the same components or the equivalents.

Figure 3:
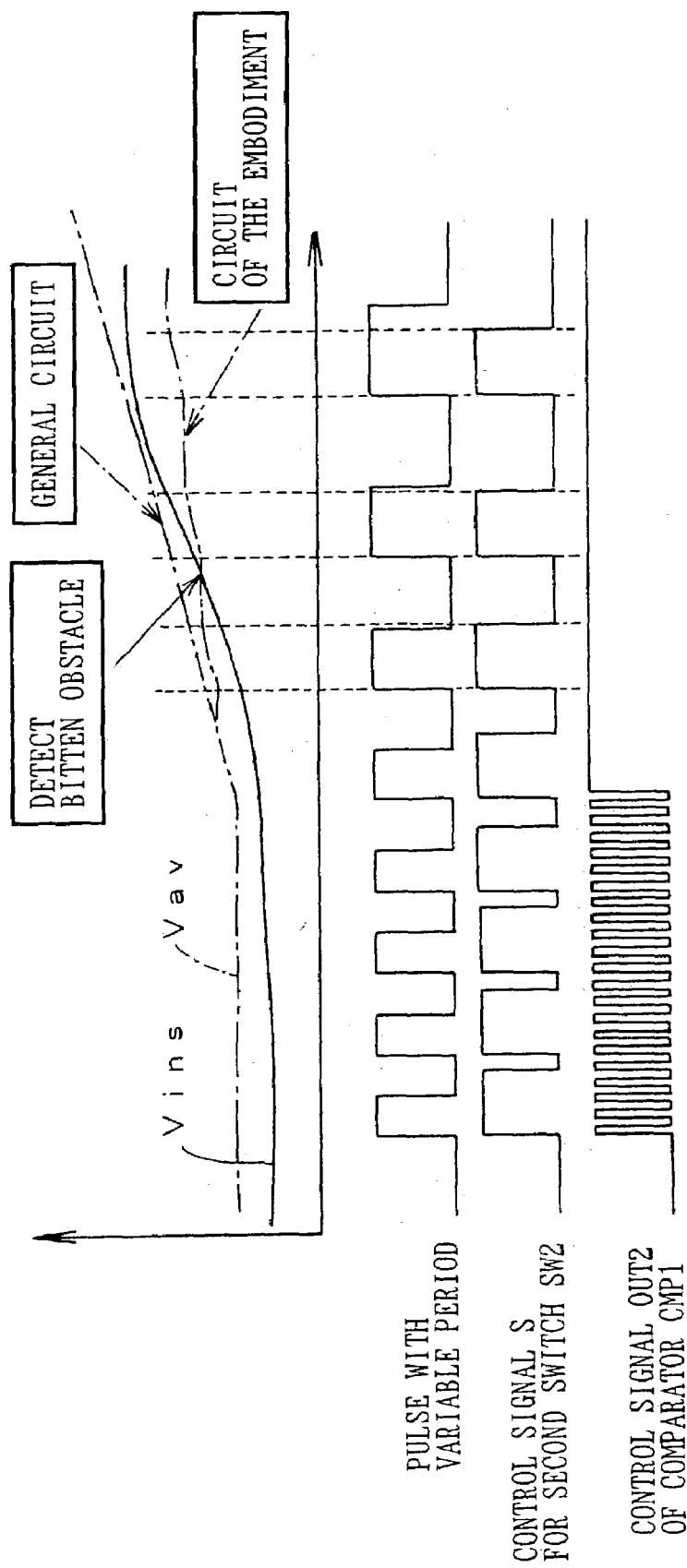
FIG. 3 is a graph and charts, explaining operation of the apparatus for detecting an obstacle to a power regulated window according to the second embodiment.

In FIG. 2, PC is a ripple/pulse converting portion which detects a component of rotating speed of a motor (call rotating speed of motor hereafter) by detecting ripples of input current flowing through the motor M, and converts the rotating speed to pulses with variable periods in response to the rotating speed of the motor as shown in FIG. 3, and outputs the pluses with variable periods. T is a one-shot timer which outputs pulses with a constant pulse width synchronizing with rising edges of the pulses with variable periods as a control signal S for a second switch SW2, as shown in FIG. 3.

Figure 5:
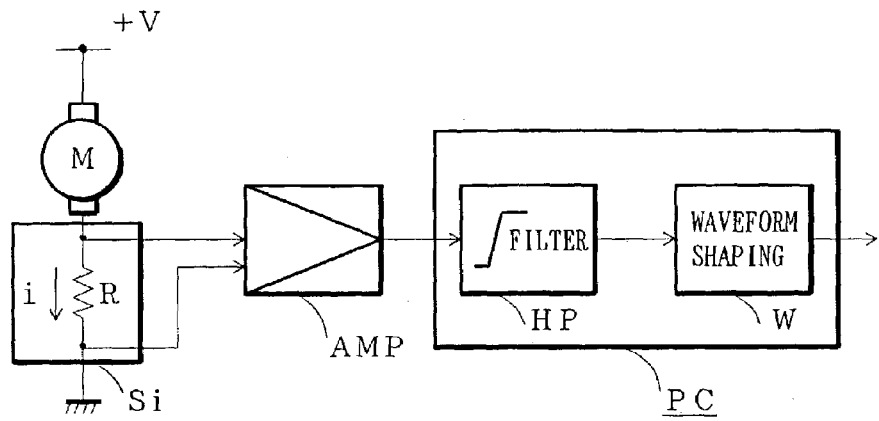
FIG. 5 is a schematic diagram of a ripple/pulse converting portion in the apparatus for detecting an obstacle to a power regulated window according to the second embodiment.
Figure 5:
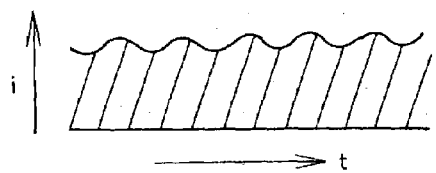
Figure 7:
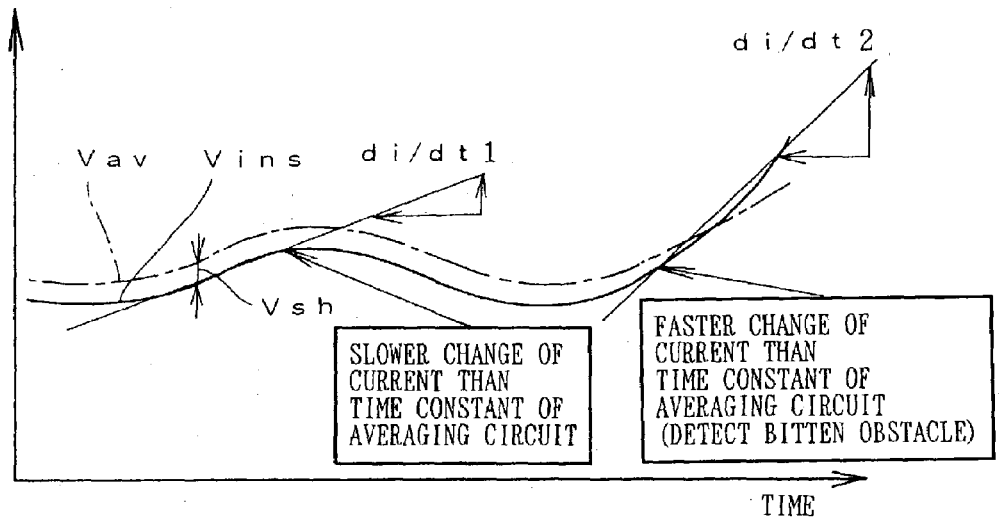
FIG. 7 is a graph, explaining operation of the general apparatus for detecting an obstacle to a power regulated window.

The ripple/pulse converting portion PC is shown in a schematic diagram of FIG. 5. Voltage having a waveform is detected at both sides of a resistance R structuring a current detector Si. The voltage having a waveform is amplified by an amplifier AMP. Then ripple components of the input current of the motor are filtered from the amplified voltage having a waveform through a highpass filter HP. Then the ripple components are converted to pulses with variable periods by a waveform shaping circuit W.

Well-known PWM converting, which outputs an H-level signal during the value of the ripple components of the voltage exceeds a predetermined threshold value, may be applied as a converting method. The period of the pules with variable periods is shortened correspondingly to increase of the rotating speed of the motor.

CMP1 is a comparator which compares a momentary value Vins outputted from the amplifier AMP with a later-described average value Vav generated with rotating speed of a motor, and outputs a H-level control signal OUT2 when Vins exceeds Vav or outputs a L-level control signal OUT2 when Vav exceeds Vins. SW1 is a first switch which switches a traveling contact to an input side of constant current CR1 or an output side CR2 of constant current by H-level or L-level of the control signal OUT2. SW2 is a second switch in which one terminal is connected with the traveling contact of the first switch SW1 and the other terminal is connected through a capacitor C1 with a ground.

The second switch SW2 turns ON by ON condition of the one shot timer T and turns OFF by OFF condition of the one shot timer T. Charged voltage of the capacitor C1 is inputted into a minus input terminal of the comparator CMP1 as an average value Vav to be compared with a momentary value Vins inputted into a plus input terminal of the comparator CMP1.

Operation of this embodiment as mentioned above will be described herein.

When pulses with variable periods from the ripple/pulse converter PC are inputted into the one shot timer T, the one shot timer T outputs the control signal S having a constant ON time synchronizing with rising edges of the pulses with variable periods to the second switch SW2. Thereby, the second switch SW2 maintained ON during ON time of the control signal S forms a charging circuit for the capacitor C.

When the comparator CMP1 provided in the averaging circuit compares a momentary value Vins with an average value Vav in an ON condition of the second switch SW2, the capacitor C1 is not charged so that the average value Vav is smaller than the momentary value Vins Accordingly, the control signal OUT2 outputted from the comparator CMP1 is H-level so that the first switch SW1 is switched to the input side of the constant current CR1 and charging current from a constant current source (not shown) flows the capacitor C1 for charging.

When the charging voltage (average value Vav) exceeds the momentary value Vins, the control signal OUT2 outputted from the comparator CMP1 is L-level so that the first switch SW1 is switched to the output side of the constant current CR2 and the capacitor C1 is discharged.

Figure 4:
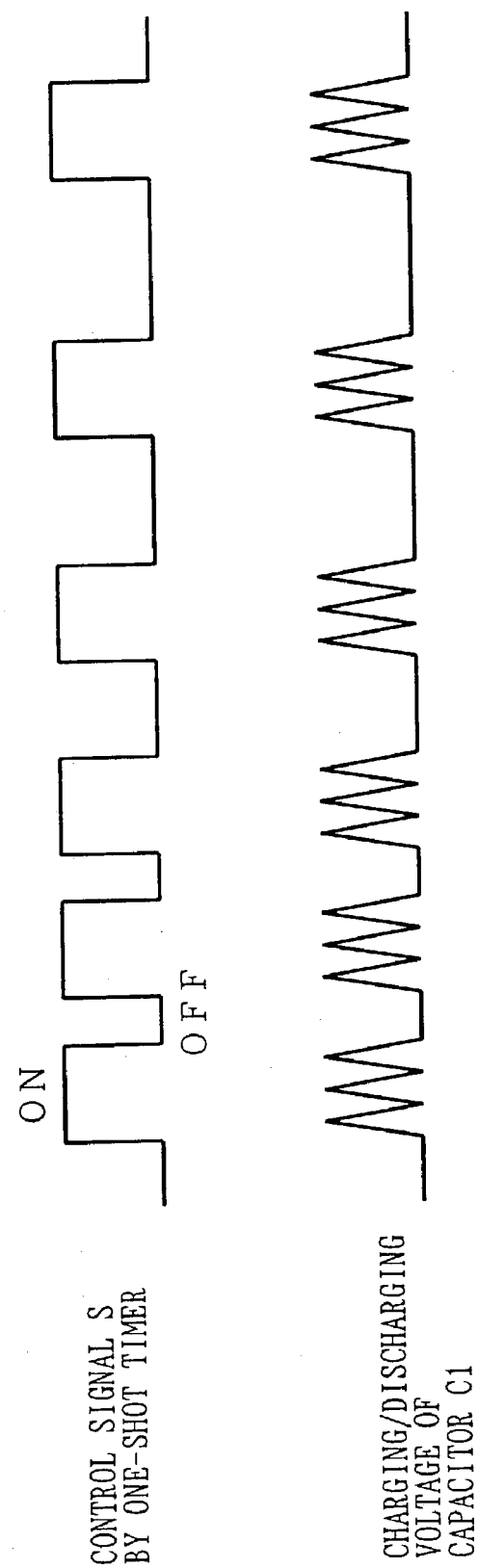
FIG. 4 is a timing chart, explaining to set a time constant in the apparatus for detecting an obstacle to a power regulated window according to the second embodiment.

Operation of charging and discharging the capacitor C1 is repeated while the control signal S outputted from the one shot timer T are maintained ON, as shown in FIG. 4. An averaged value of charging/discharging voltage of the capacitor C1 is inputted as the average value Vav into the minus input terminal of the comparator CMP1.

As shown in FIG. 3, OFF time of the control signal S is short at high rotating speed of the motor and is long at low rotating speed of the motor. The time constant is fixed while the second switch SW2 is ON. ON time per unit time of the second switch SW2 is shortened in proportion to retardation of rotating speed, in other words, OFF time of the second switch SW2 is elongated equivalently to elongate the time constant in an averaging circuit.

Thus, the averaging circuit of this embodiment generates an average value Vav, as a reference against a momentary value Vins, by smoothing charging/discharging current of a capacitor independent of the momentary value with a time constant to be elongated in proportion to retardation of rotating speed of a motor, instead of smoothing the momentary value Vins with a fixed time constant.

The generated average value Vav as mentioned above is inputted into the minus input terminal of the comparator CMP1 and compared with the momentary value Vins at the comparator CMP1. As shown in FIG. 3, even if an obstacle exists at very slow steady rotating speed of the motor M and over-load current with slow changed value flows through the motor M so that the momentary value Vins changes slowly longer than the present time constant, the average value Vav does not follow the momentary value Vins. After an intersection point of a curve of the momentary value Vins and a curve of the average value Vav, the momentary value Vins exceeds the average value Vav and the comparator CMP outputs a signal of judgment of existence of an obstacle OUT1.

Detecting the obstacle to a window glass is explained by retardation of rotating speed of a motor as mentioned above. However, rotating speed of a motor is changed widely by change of mechanical load caused by change of mechanical friction in mechanical components or the like, other than change of driving voltage. Causes of the change of mechanical friction may be temperature change, distortion and aged deterioration those are not electrically detected easily. To drive the motor to maintain a constant torque against change of mechanical load, input current (load current) is changed widely.

In a method of deferential current, influences by above changes may be eliminated by means of controlling input current of a motor based on comparing a momentary value with an average value given by following the momentary value. However, the average value by following the momentary value is not feedbacked by a mechanical output power so that the average value by following may follow the momentary value at low rotating speed.

This invention can solve above drawback to feedback rotating speed of a motor, independent of a momentary value, to a time constant of an averaging circuit.

While the forms of the invention herein disclosed constitute presently preferred embodiments, many others are possible. It is not intended herein to mention all the possible embodiments of the invention which will be apparent to those skilled in the art. It is understood that the term used herein are merely descriptive rather than limiting, in that various changes may be made without departing from the scope of this invention as defined by the following claims.

What is claimed is:

1. An apparatus for detecting an obstacle to a power regulated window to be opened and closed by a motor comprising:
   current detecting means for detecting a momentary value of load current flowing through the motor;
   pulse-signal outputting means for outputting a pulse signal having a longer pulse interval correspondingly to retardation of rotating speed of the motor, said pulse-signal outputting means comprising:
      a ripple/pulse converting portion which detects a component of rotating speed of the motor by detecting ripples of input current flowing through the motor, and converts the rotating speed of the motor to pulses with variable periods in response to the rotating speed of the motor, and outputs the pulses with variable periods; and
      a one-shot timer which inputs the pulses with variable periods and outputs pulses with a constant pulse width synchronizing with rising edges of the pulses with variable periods as a control signal;
   average-value generating means for generating and outputting an average value, the average value having a rate-of-change of an amplitude that is variable in response to a time constant, wherein the time constant has been set to have a time length-corresponding to a period of the pulse signal, the average value being a reference value for judging when the load current value of the motor exceeds a predetermined value of over-load current; and
   comparing means for judging whether or not the momentary value detected by the current detecting means exceeds the average value outputted by average-value generating means by comparing the momentary value with the average value,
   wherein existence of a bitten obstacle is detected by a judging result of the comparing means.

2. The apparatus for detecting an obstacle to a power regulated window according to claim 1, wherein, when OFF time of the pulse signal is elongated by retarding the rotating speed of the motor, the average-value generating means responds by elongating the time constant equivalently to a shortened ON time per a unit time.

* * * * *